(12) United States Patent
Saito et al.

(10) Patent No.: US 10,506,416 B2
(45) Date of Patent: Dec. 10, 2019

(54) RADIO COMMUNICATION DEVICE, RADIO COMMUNICATION SYSTEM, PROGRAM, AND RADIO COMMUNICATION METHOD

(75) Inventors: Erika Saito, Tokyo (JP); Hideyuki Suzuki, Tokyo (JP); Katsutoshi Itoh, Tokyo (JP); Masahiko Naito, Tokyo (JP); Natsuki Itaya, Tokyo (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 772 days.

(21) Appl. No.: 12/915,678

(22) Filed: Oct. 29, 2010

(65) Prior Publication Data

US 2011/0128946 A1 Jun. 2, 2011

(30) Foreign Application Priority Data

Nov. 30, 2009 (JP) ................ P2009-271363

(51) Int. Cl.
| | | |
|---|---|---|
| *H04W 8/00* | (2009.01) | |
| *H04W 4/00* | (2018.01) | |
| *H04W 28/18* | (2009.01) | |
| *H04W 48/08* | (2009.01) | |

(52) U.S. Cl.
CPC ............ *H04W 8/005* (2013.01); *H04W 4/00* (2013.01); *H04W 28/18* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 8,170,481 B2 * | 5/2012 | Rangarajan et al. | 455/41.2 |
| 2003/0036350 A1 | 2/2003 | Jonsson et al. | |
| 2006/0092888 A1 * | 5/2006 | Jeong | H04W 48/14 370/338 |
| 2006/0221919 A1 * | 10/2006 | McRae et al. | 370/338 |
| 2007/0141988 A1 * | 6/2007 | Kuehnel et al. | 455/41.2 |

(Continued)

FOREIGN PATENT DOCUMENTS

| | | |
|---|---|---|
| JP | 2007-096917 | 4/2007 |
| JP | 2008-517558 | 5/2008 |
| JP | 2008-538272 | 10/2008 |

(Continued)

OTHER PUBLICATIONS

S. Sud et al., "Enabling Rapid Wireless System Composition through Layer-2 Discovery", IEEE Network, IEEE Service Center, vol. 22, No. 4, pp. 14-20, XP011232023 (2008).

(Continued)

*Primary Examiner* — Christopher M Crutchfield
*Assistant Examiner* — Alan L Lindenbaum
(74) *Attorney, Agent, or Firm* — Paratus Law Group, PLLC

(57) ABSTRACT

Provided is a radio communication device which includes a communication unit that communicates with a connected radio communication device operating as a master unit, and a control unit that, when a prescribed inquiry packet sent from another radio communication device is received by the communication unit, controls the communication unit to send a response packet containing service information indicating a service with which the radio communication device is compatible to said another radio communication device.

33 Claims, 11 Drawing Sheets

(56) References Cited

U.S. PATENT DOCUMENTS

2010/0135200 A1* 6/2010 Karaoguz et al. ............ 370/328

FOREIGN PATENT DOCUMENTS

| | | |
|---|---|---|
| JP | 2008-538465 | 10/2008 |
| JP | 2008-283590 | 11/2008 |
| JP | 2009-537898 | 10/2009 |
| WO | WO 03/003610 A1 | 1/2003 |
| WO | WO 2010/052523 A1 | 5/2010 |

OTHER PUBLICATIONS

European Search Report dated Feb. 16, 2011, in Munich in corresponding EP 10 18 7783.

Jul. 23, 2013, JP communication issued for related JP application No. 2009-271363.

Aug. 20, 2013, CN communication issued for related CN application No. 2010-10567115.0.

Mar. 6, 2014, Extended European Search Report for related EP application No. 14150227.8.

Feb. 3, 2015, JP communication issued for related JP application No. 2014-042567.

Sep. 15, 2015, Japanese Office Action for related JP application No. 2014-042567.

Nov. 25, 2015, KR communication issued for related KR application No. 10-2010-0116277.

Shivani Sud, et al., Enabling Rapid Wireless System Composition through Layer-2 Discovery, IEEE Network, Jul./Aug. 2008, pp. 14-20.

Oct. 19, 2016, EP communication issued for related EP application No. 14150227.8.

Michael Montemurro, et al., TDLS Peer Discovery, IEEE P802.11 Wireless LANs, doc.: IEEE 802.11-09/1218r0, Nov. 17, 2009, pp. 1-5.

Dave Stephenson, et al., LB-137: Proposal for Bi-Directional GAS Query/Response, IEEE P802.11 Wireless LANs, doc.: IEEE 802.11-09/0033r0, Jan. 18, 2009, pp. 1-11.

Nov. 1, 2017, Chinese Office Action Issued for related CN application No. 201510187554.1.

May 17, 2017, CN communication issued for related CN application No. 201410108656.5.

Jul. 5, 2018, European Search Report issued for related EP application No. 18171243.1.

\* cited by examiner

FIG. 2
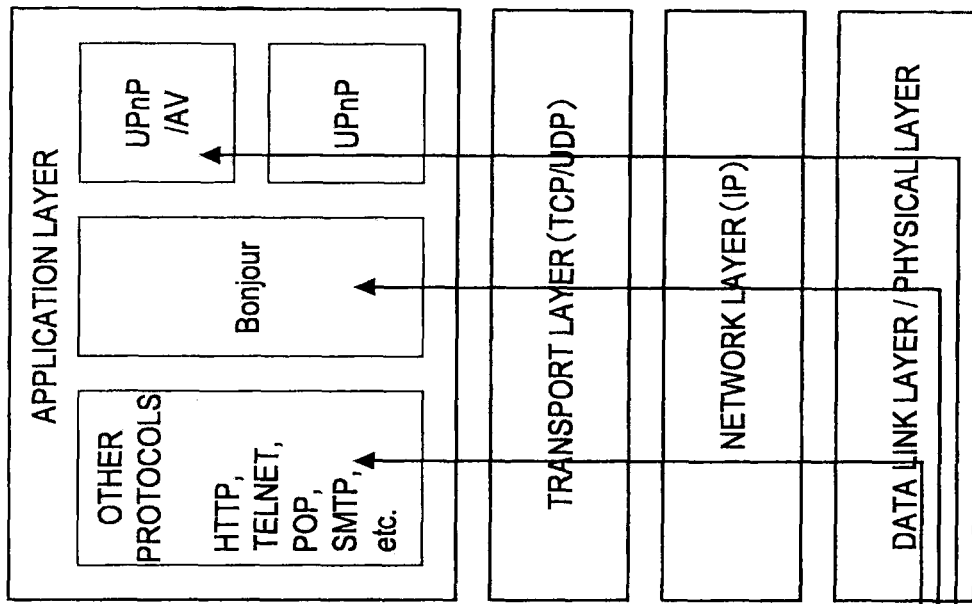
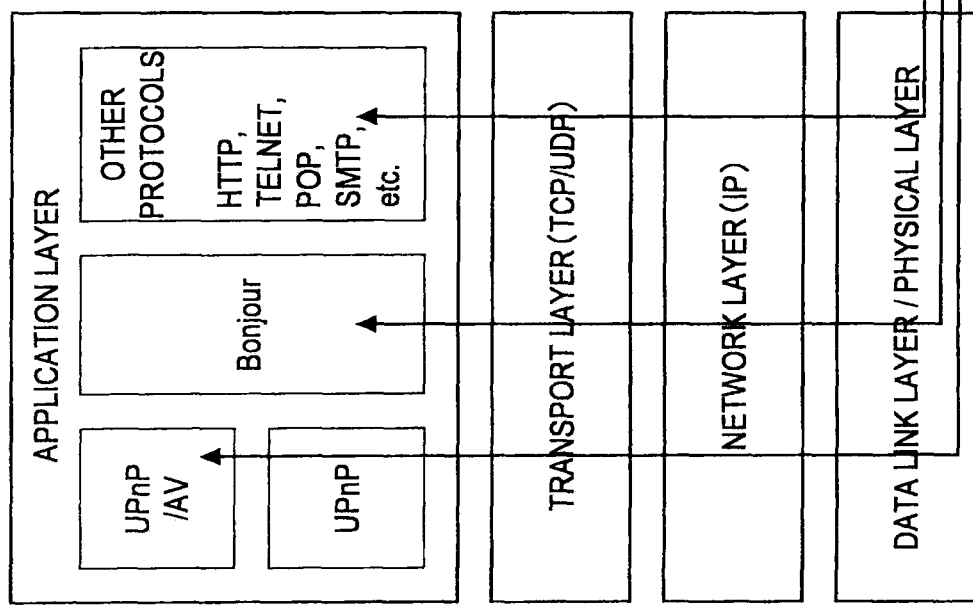

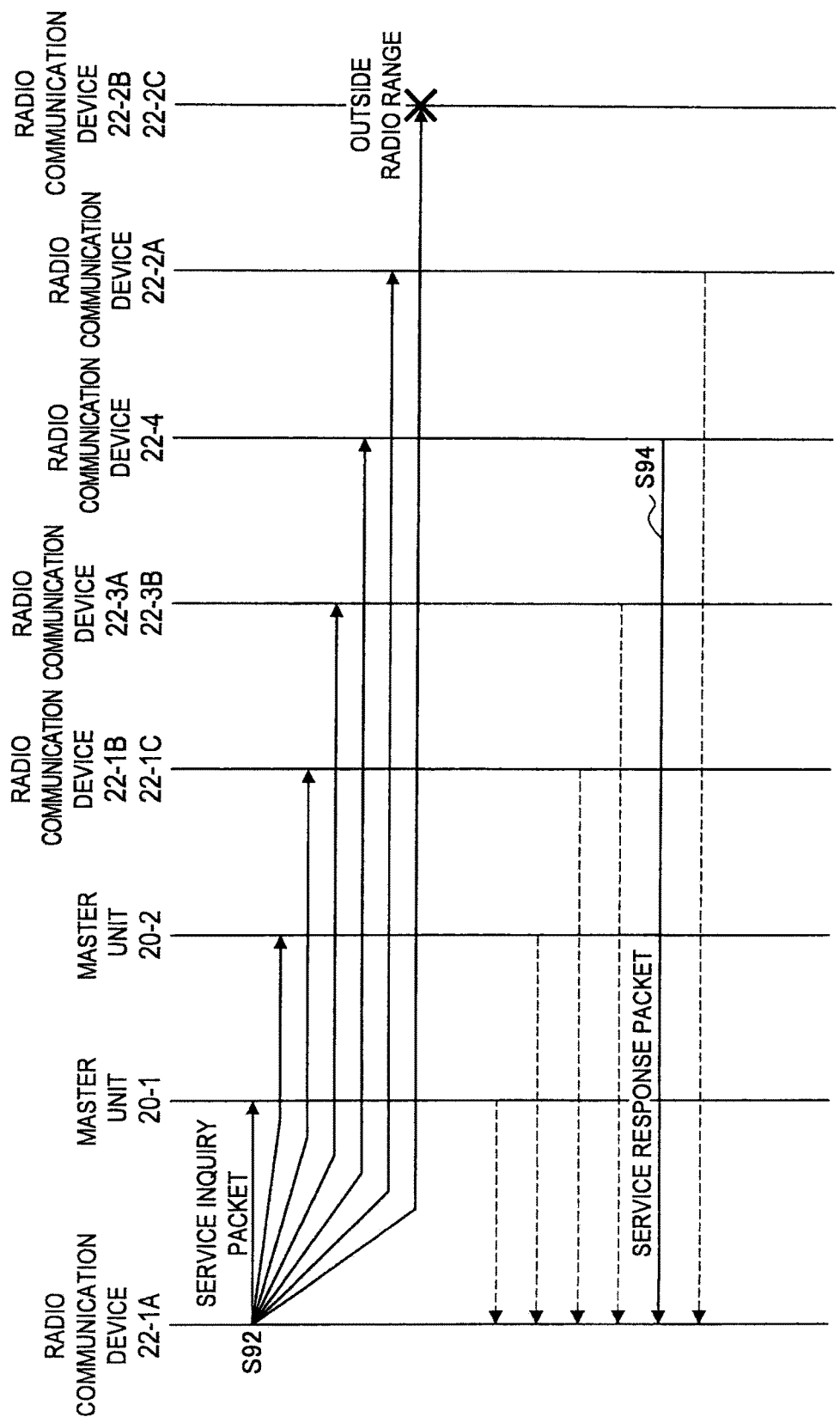

RADIO COMMUNICATION DEVICE, RADIO COMMUNICATION SYSTEM, PROGRAM, AND RADIO COMMUNICATION METHOD

BACKGROUND OF THE INVENTION

Field of the Invention

The present invention relates to a radio communication device, a radio communication system, a program, and a radio communication method.

Description of the Related Art

A wireless LAN (Local Area Network) system as represented by IEEE (Institute of Electrical and Electronics Engineers) 802.11 is becoming increasingly common in place of a wired network for its advantages such as high flexibility of equipment. For example, as disclosed in Japanese Unexamined Patent Publication No. 2008-283590, the wireless LAN system standardized by the IEEE 802.11 is composed of groups of radio communication devices which are an access point operating as a master unit and a plurality of stations operating as slave units, and a plurality of stations are connected to one access point.

Further, services such as UPnP and Bonjour are known as application services for finding a communication device that exists on an IP network. Those services are based on the assumption that the same service is implemented in both of a communication device on the finding side and a communication device on the found side.

As a means of directly transmitting data between slave units without through a master unit, TDLS (Tunneled Direct Link Setup) is specified by IEEE P802.11/D5.0. For direct data transmission between slave units using the TDLS, it is specified to perform connection processing between the slave units by using data packets.

SUMMARY OF THE INVENTION

However, the above-described services such as UPnP and Bonjour can only find the communication device that joins the same network as the communication device on the finding side and is compatible with the same service. Further, because it is specified for direct data transmission between slave units using the TDLS to perform connection processing between the slave units by using data packets, the master unit is unable to recognize the contents of the connection processing.

Further, although the finding of a radio communication device may be implemented by the function of the data link layer or the network layer, according to the specification of IEEE Std 802.11-2007, a frame which can be transmitted and received is limited depending on a connection state with a master unit at the other end of communication and an authentication state. Thus, there is a concern that it is difficult for a certain radio communication device to collect information of a radio communication device that exists within its radio range but belongs to a different communication group.

In light of the foregoing, it is desirable to provide a novel and improved radio communication device, radio communication system, program and radio communication method that enable a radio communication device to collect information of another radio communication device existing within its radio range.

According to an embodiment of the present invention, there is provided a radio communication device including a communication unit that communicates with a connected radio communication device operating as a master unit, and a control unit that, when a prescribed inquiry packet sent from another radio communication device is received by the communication unit, controls the communication unit to send a response packet containing service information indicating a service with which the radio communication device is compatible to said another radio communication device.

The inquiry packet may contain the service information, and the control unit may control the communication unit to send the response packet when the radio communication device is compatible with the service indicated by the service information.

The inquiry packet may contain the service information, and the control unit may perform control of sending the response packet without depending on whether the radio communication device is compatible with the service indicated by the service information.

The control unit may perform control of sending the response packet without depending on a connection state and an authentication state of the radio communication device.

The service information contained in the inquiry packet and the service information contained in the response packet may be interpreted in the data link layer.

The inquiry packet and the response packet may conform to an action frame specified by IEEE Std 802.11-2007.

The response packet may be used for selection of a device at another end of communication by said another radio communication device.

According to another embodiment of the present invention, there is provided a radio communication system including a first radio communication device that sends a prescribed inquiry packet, and a second radio communication device that communicates with a connected radio communication device operating as a master unit. The second radio communication device includes a communication unit that communicates with the connected radio communication device, and a control unit that, when the prescribed inquiry packet sent from the first radio communication device is received by the communication unit, controls the communication unit to send a response packet containing service information indicating a service with which the second radio communication device is compatible to the first radio communication device.

According to another embodiment of the present invention, there is provided a program causing a computer to function as a radio communication device including a communication unit that communicates with a connected radio communication device operating as a master unit, and a control unit that, when a prescribed inquiry packet sent from another radio communication device is received by the communication unit, controls the communication unit to send a response packet containing service information indicating a service with which the radio communication device is compatible to said another radio communication device.

According to another embodiment of the present invention, there is provided a radio communication method including the steps of sending a prescribed inquiry packet from a first radio communication device, receiving the inquiry packet by a second radio communication device that communicates with a connected radio communication device operating as a master unit, and sending a response packet containing service information indicating a service with which the second radio communication device is compatible from the second radio communication device to the first radio communication device.

According to the embodiments of the present invention described above, it is possible to enable a radio communication device to collect information of another radio communication device existing within its radio range.

BRIEF DESCRIPTION OF THE DRAWINGS

FIG. 2 is an explanatory view showing an example of an upper layer protocol of UPnP, Bonjour or the like.

FIG. 11 is a sequence chart showing a second operation example according to the embodiment.

DETAILED DESCRIPTION OF THE EMBODIMENT(S)

Figure 1:
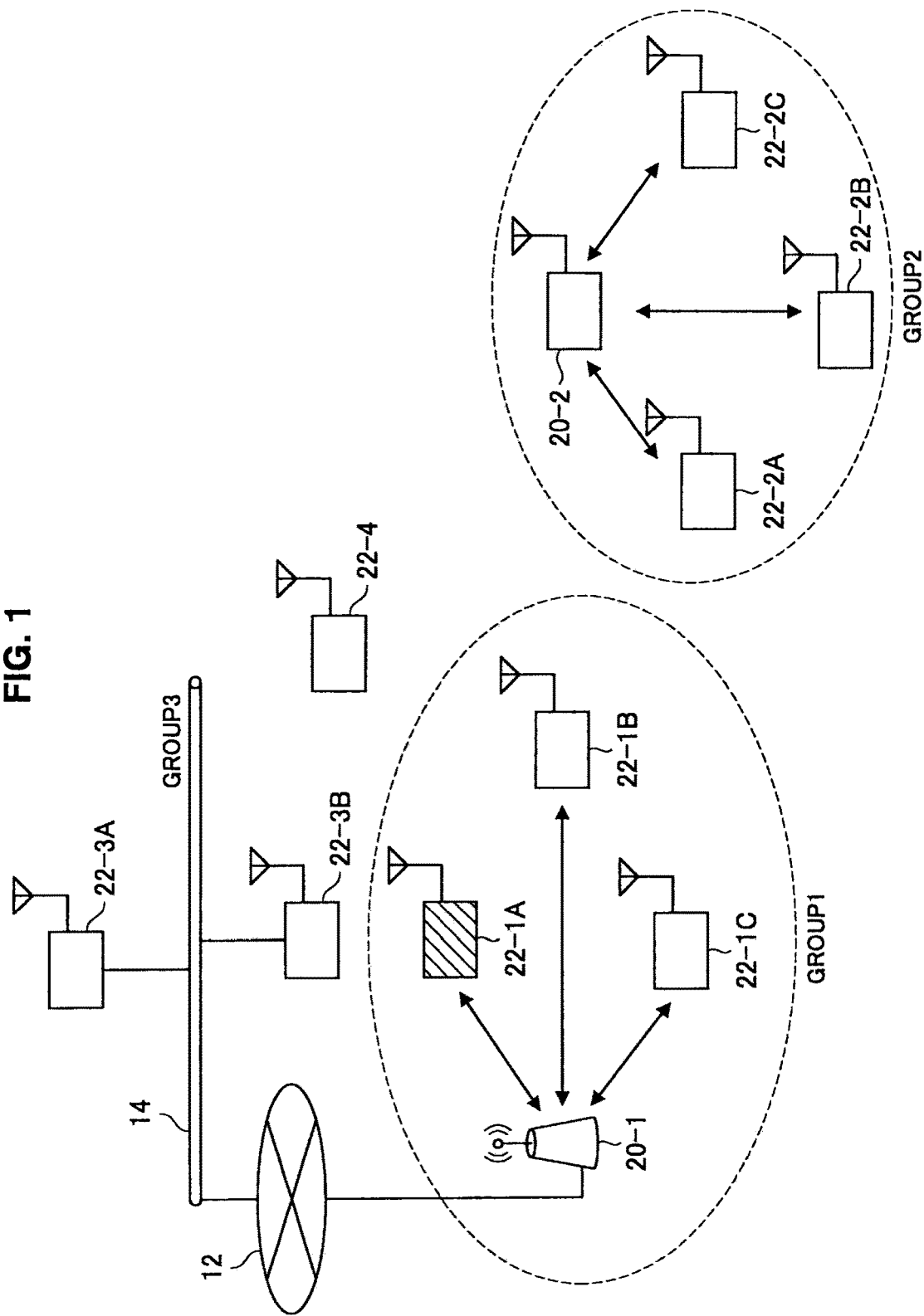
FIG. 1 is an explanatory view showing a configuration of a radio communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different number with a hyphen to the same reference numeral in some cases. For example, a plurality of structural elements having substantially the same function are distinguished like a master unit 20-1, a master unit 20-2 and so on where necessary. However, when there is no particular need to distinguish between a plurality of structural elements having the same function, they are denoted by the same reference numeral. For example, when there is no particular need to distinguish between the master unit 20-1, the master unit 20-2 and so on, they are referred to simply as the master unit 20.

A preferred embodiment of the present invention will be described hereinafter in the following order.

1. Overall Configuration of Radio Communication System
2. Configuration of Radio Communication Device
3. Operation for Collecting Information of Radio Communication Device in Vicinity
    3-1. First Operation Example
    3-2. Second Operation Example
4. Summary

1. Overall Configuration of Radio Communication System

An overall configuration of a radio communication system according to an embodiment of the present invention is described hereinafter with reference to FIG. 1.

FIG. 1 is an explanatory view showing a configuration of a radio communication system according to an embodiment of the present invention. Referring to FIG. 1, the radio communication system according to the embodiment of the present invention is composed of a plurality of groups of radio communication devices.

Specifically, a group 1 is composed of a master unit 20-1 and radio communication devices 22-1A to 22-1C that operate as slave units. In the group 1, communication is managed by the master unit 20-1. Note that, in a system that decides a parentage before forming a connection group, when a radio communication devices 22, even if it is not an access point, is determined to serve as a master unit, it operates as the master unit such as performing beacon transmission, and a plurality of radio communication devices 22 that operate as slave units or that are determined to serve as slave units can be connected thereto.

Further, a group 2 is composed of a master unit 20-2 that, though being a radio communication device 22, has already formed a group and is operating as a master unit, and radio communication devices 22-2A to 22-2C that operate as slave units. In the group 2, the group is managed by the master unit 20-2.

Furthermore, a group 3 is composed of radio communication devices 22-3A and 22-3B that operate as slave units and are connected to a network 12 through a wired cable 14. In addition, the radio communication system shown in FIG. 1 includes a radio communication device 22-4. Note that the network 12 is a wired or wireless transmission channel of information that is transmitted from a device connected to the network 12. For example, the network 12 may include a public network such as the Internet, a telephone line network or a satellite communications network, various kinds of LAN (Local Area Network) including Ethernet (registered trademark), WAN (Wide Area Network) or the like. Further, the network 12 may include a leased line network such as IP-VPN (Internet Protocol-Virtual Private Network).

The radio communication device 22 may be an information processing device such as a PC (Personal Computer), a mobile phone, a portable music playback device, a home video processing device (e.g. a DVD recorder, a videocassette recorder etc.), a home video display device, a PDA (Personal Digital Assistants), a home game device, an electrical household appliance, a portable video processing device, or a portable game device.

Protocols such as UPnP and Bonjour may be used for the radio communication device 22-1A, for example, to find the radio communication device 22 in the vicinity. However, as shown in FIG. 2, those protocols are based on the assumption that a communication device on the finding side and a communication device on the found side have conducted a connection procedure and become the state capable of exchanging data with each other and further that the same protocol is implemented in both of the devices. Therefore, devices that can be found by the radio communication device 22-1A are limited only to the radio communication device 22 in which the same protocol as the radio communication device 22-1A is implemented.

Further, there is a possibility that the radio communication device 22-1A can find the radio communication device 22 in the vicinity by sending and receiving a probe request packet and a probe response packet, respectively. The sending and receiving of the probe request packet and the probe response packet are described hereinafter with reference to FIG. 3.

Figure 3:
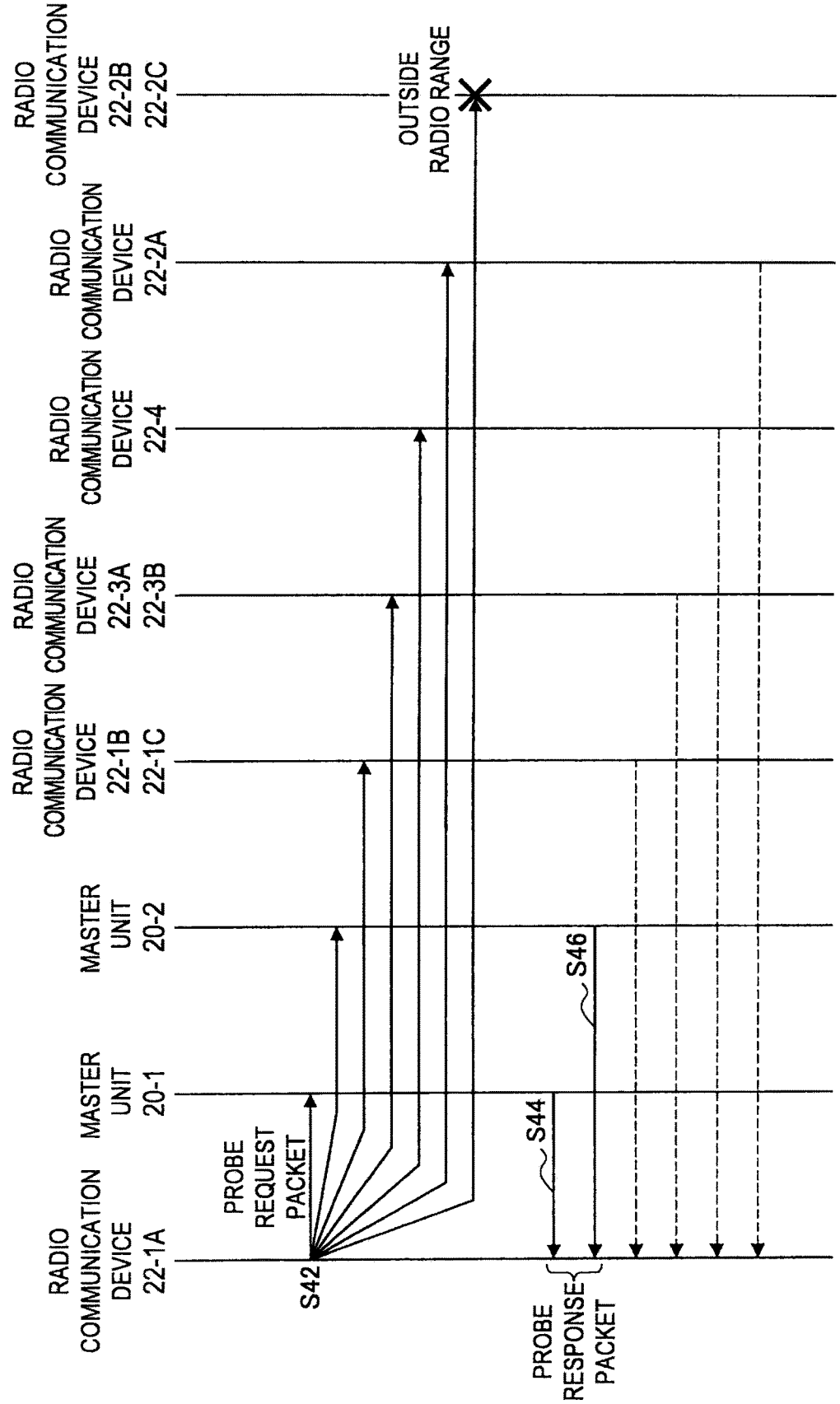
FIG. 3 is a sequence chart showing sending and receiving of a probe request packet and a probe response packet.

FIG. 3 is a sequence chart showing the sending and receiving of the probe request packet and the probe response packet. Referring to FIG. 3, when the radio communication device 22-1A sends a probe request packet (S42), devices that exist within the radio range of the radio communication device 22-1A receive the probe request packet. Specifically, the master units 20-1 and 20-2, and the radio communication devices 22-1B, 22-1C, 22-3A, 22-3B, 22-4, and 22-2A that exist within the radio range receive the probe request packet. On the other hand, the radio communication devices 22-2B and 22-2C that exist outside the radio range fail to receive the probe request packet. Note that the radio communication device 22-1A may send the probe request packet by broadcast or by designating a particular device at the other end of communication.

Figure 4:
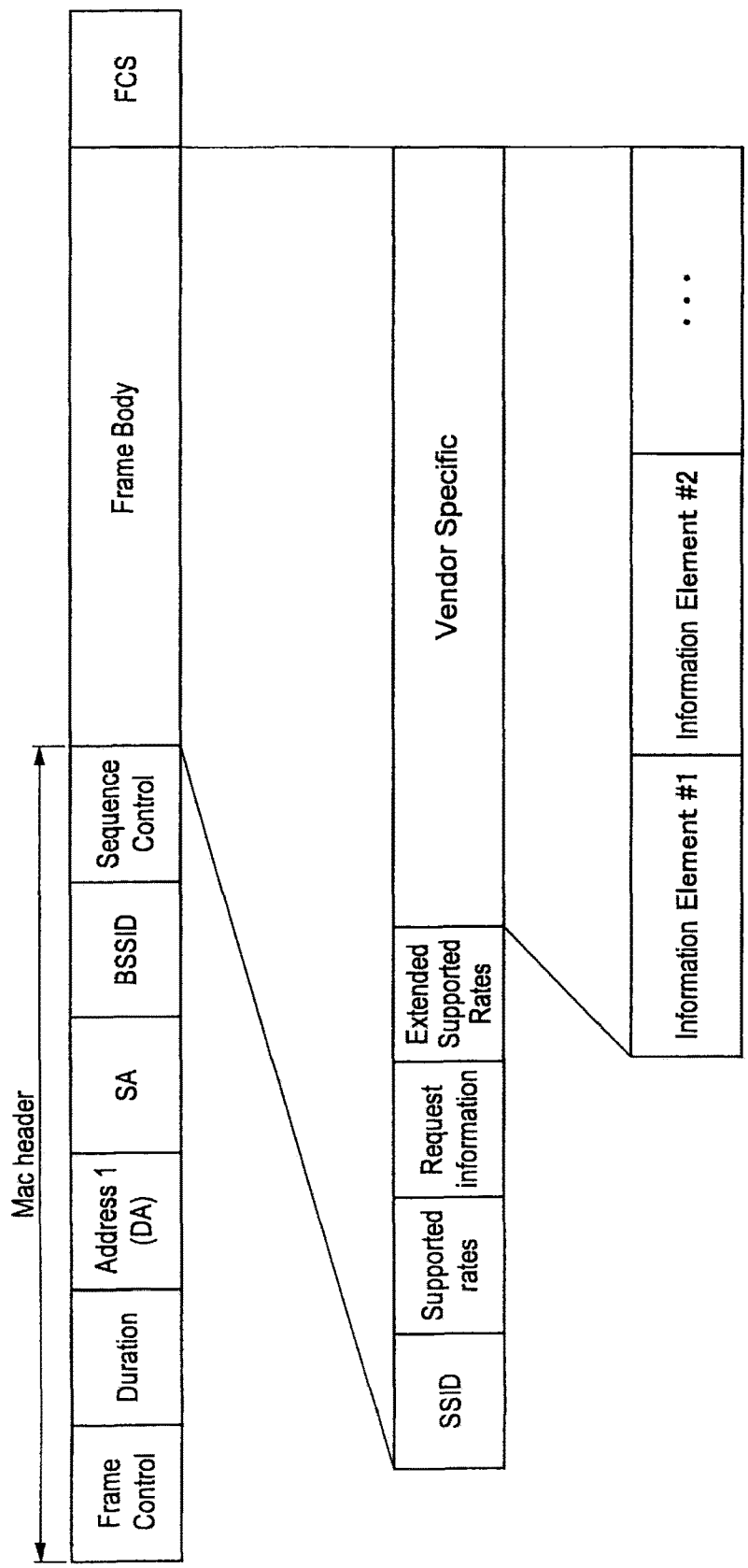
FIG. 4 is an explanatory view showing an exemplary structure of a probe request packet.

Note that the probe request packet has the structure shown in FIG. 4, for example, and contains information (Information Element #1, #2 . . . ) which indicates a communication function of a transmission source device.

Figure 5:
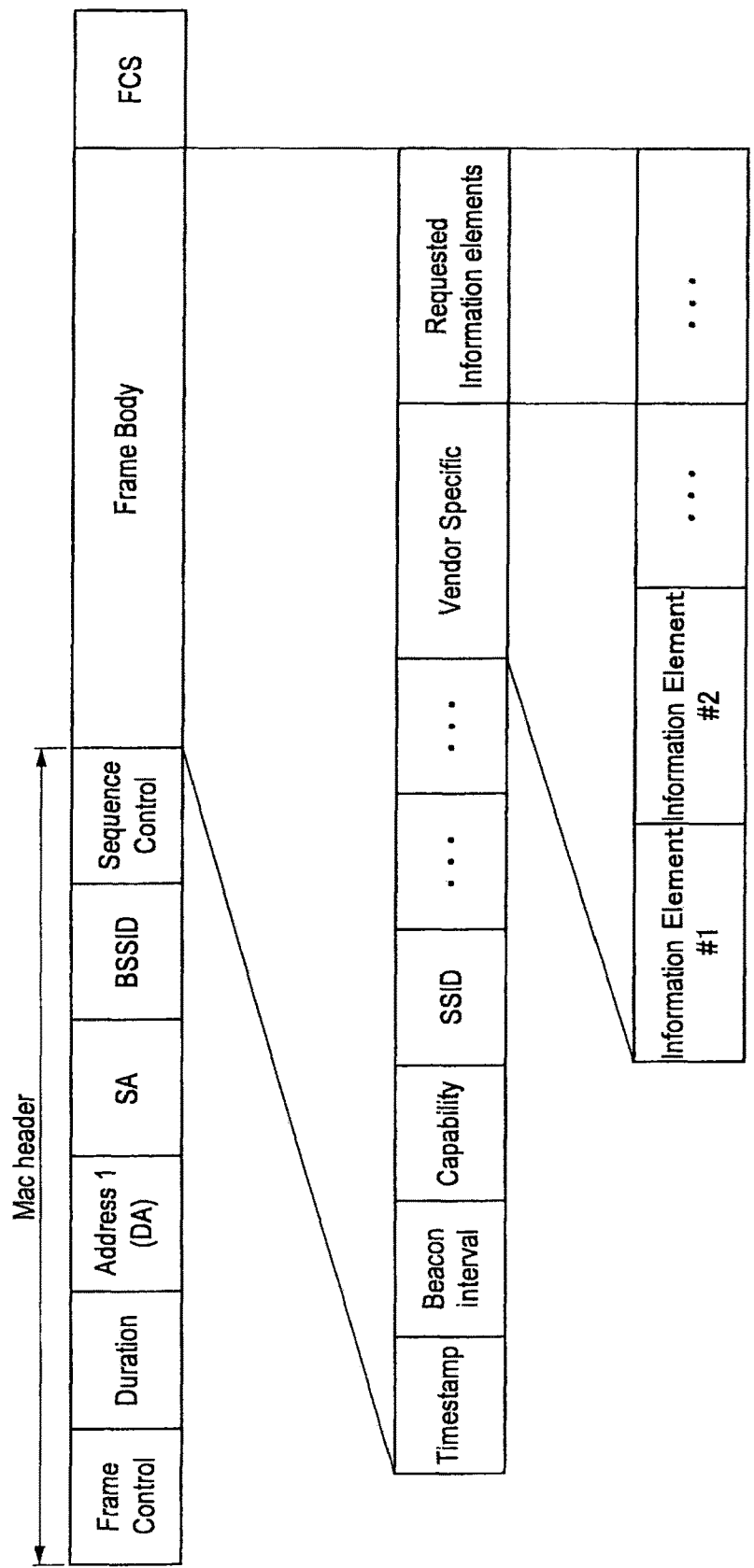
FIG. 5 is an explanatory view showing an exemplary structure of a probe response packet.

After that, the master units 20-1 and 20-2 that have received the probe request packet send probe response packets having the structure shown in FIG. 5, for example, to the radio communication device 22-1A (S44, S46). On the other hand, the radio communication devices 22-2B and 22-2C that have failed to receive the probe request packet do not send the probe response packet. Further, the radio communication devices 22-1B, 22-1C, 22-3A, 22-3B, 22-4, and 22-2A that are operating as slave units, not being access points, also do not send the probe response packet in accordance with the specification of IEEE Std 802.11-2007, for example.

As described above, because the radio communication devices 22 that can send the probe response packet back are limited, the radio communication device 22-1A is unable to sufficiently collect information of the radio communication devices 22 that exist in the vicinity even with use of the probe request packet.

Figure 6:
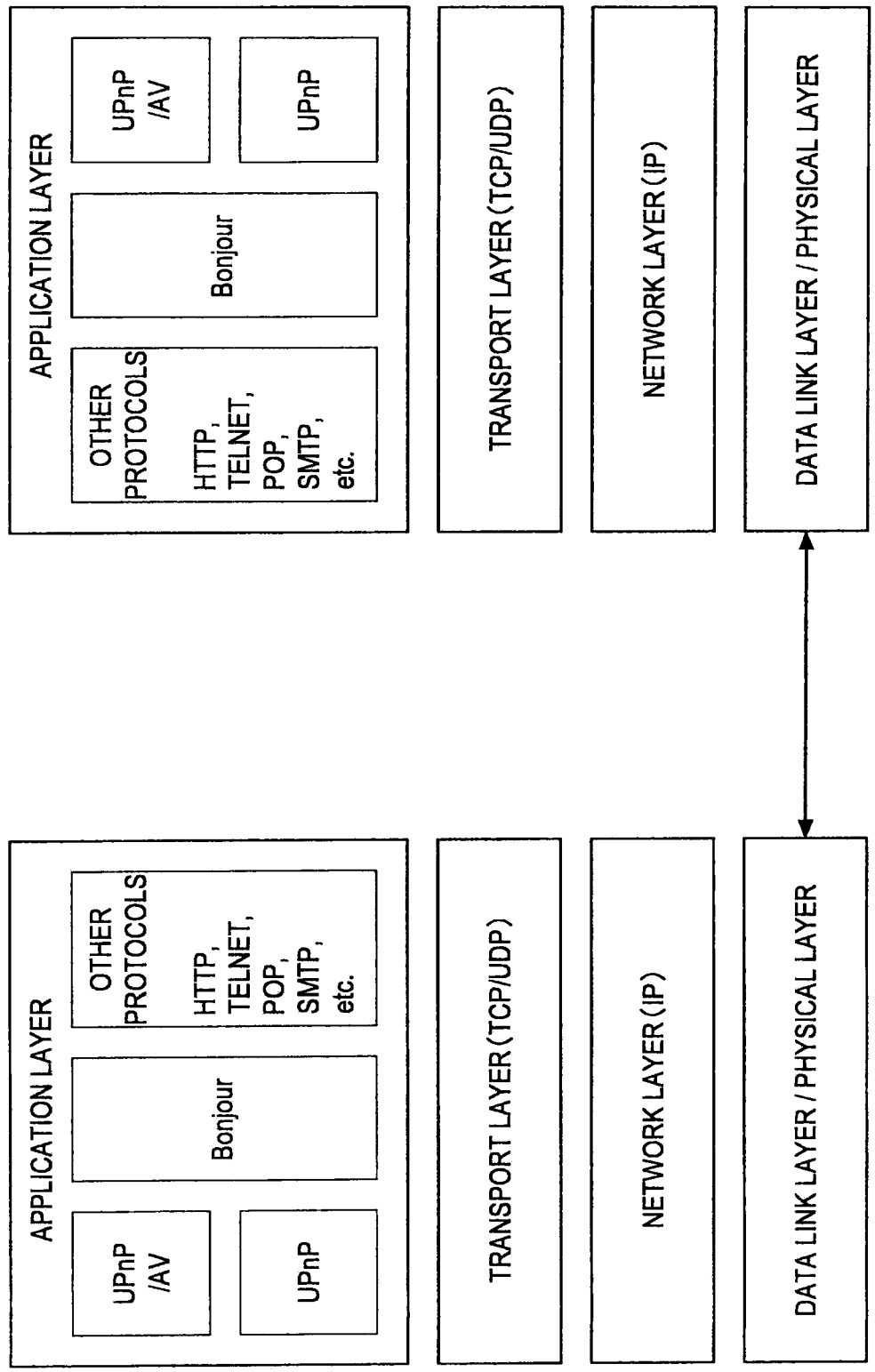
FIG. 6 is an explanatory view showing that a packet sent and received in the embodiment is interpreted in the data link layer.

Prescribed such circumstances, an embodiment of the present invention has been invented. According to the embodiment, the radio communication device can effectively collect information of other radio communication devices existing within its radio range by sending and receiving a prescribed service inquiry packet and a service response packet. Further, according to the embodiment, it is possible to interpret the service inquiry packet and the service response packet without depending on the upper layer protocol of each radio communication device 22 as shown in FIG. 6. The embodiment is described hereinafter in detail.

2. Configuration of Radio Communication Device

Figure 7:
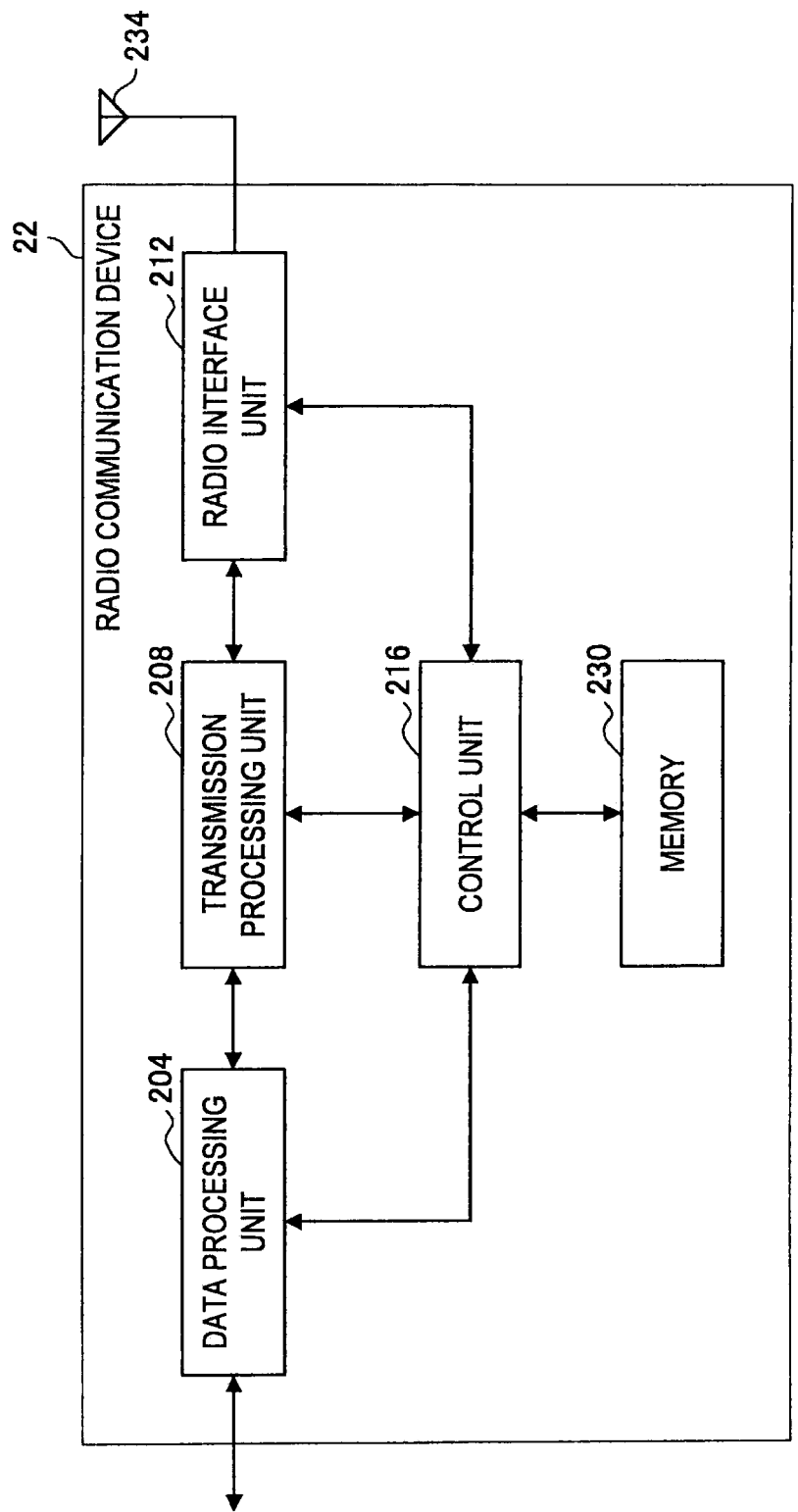
FIG. 7 is a functional block diagram showing a configuration of a radio communication device 22 according to the embodiment.

FIG. 7 is a functional block diagram showing a configuration of a radio communication device 22 according to the embodiment. Referring to FIG. 7, the radio communication device 22 includes a data processing unit 204, a transmission processing unit 208, a radio interface unit 212, a control unit 216, a memory 230, and an antenna 234.

In a transmitting operation, the data processing unit 204 creates various data frames and data packets in response to a request from an upper layer, for example, and supplies them to the transmission processing unit 208. The transmission processing unit 208 performs, during transmission, processing such as addition of various data headers or an error detecting code such as FCS (Frame Check Sequence) to the packets created by the data processing unit 204 and then provides the processed data to the radio interface unit 212. The radio interface unit 212 generates a modulation signal in a frequency band of a carrier wave from the data received from the transmission processing unit 208 and transmits the signal as a radio signal from the antenna 234.

Further, in a receiving operation, the radio interface unit 212 performs down-conversion of a radio signal received by the antenna 234 and converts the signal into a bit string to thereby decode various data frames. The transmission processing unit 208 analyzes headers added to the various data frames supplied from the radio interface unit 212 and, confirming that there is no error in the data frames based on the error detecting code, supplies the various data frames to the data processing unit 204. The data processing unit 204 processes and analyzes the various data frames and data packets supplied from the transmission processing unit 208. In this manner, the data processing unit 204, the transmission processing unit 208, the radio interface unit 212 and the antenna 234 function as a communication unit.

The control unit 216 controls the receiving operation and the transmitting operation of the data processing unit 204, the transmission processing unit 208, and the radio interface unit 212. For example, the control unit 216 performs operations such as determination of a use frequency, instruction for creation or transmission of control messages, interpretation of control messages, and connection process control. Note that if the radio communication device 22 can operate as both of a slave unit and a master unit, the control messages are annunciation information such as a beacon, an acknowledgement of a beacon, a probe request, a probe response and the like, a service inquiry packet, and a service response packet according to the present embodiment.

The memory 230 has a role of a working area of data processing by the control unit 216 and a function of a storage medium that stores various kinds of data. The memory 230 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on.

3. Operation for Collecting Information of Radio Communication Device in Vicinity The configuration of the radio communication device 22 is described above with reference to FIG. 7. Hereinafter, a first operation example and a second operation example for the radio communication device 22 to collect information of other radio communication devices existing in the vicinity.

3-1. First Operation Example

Figure 8:
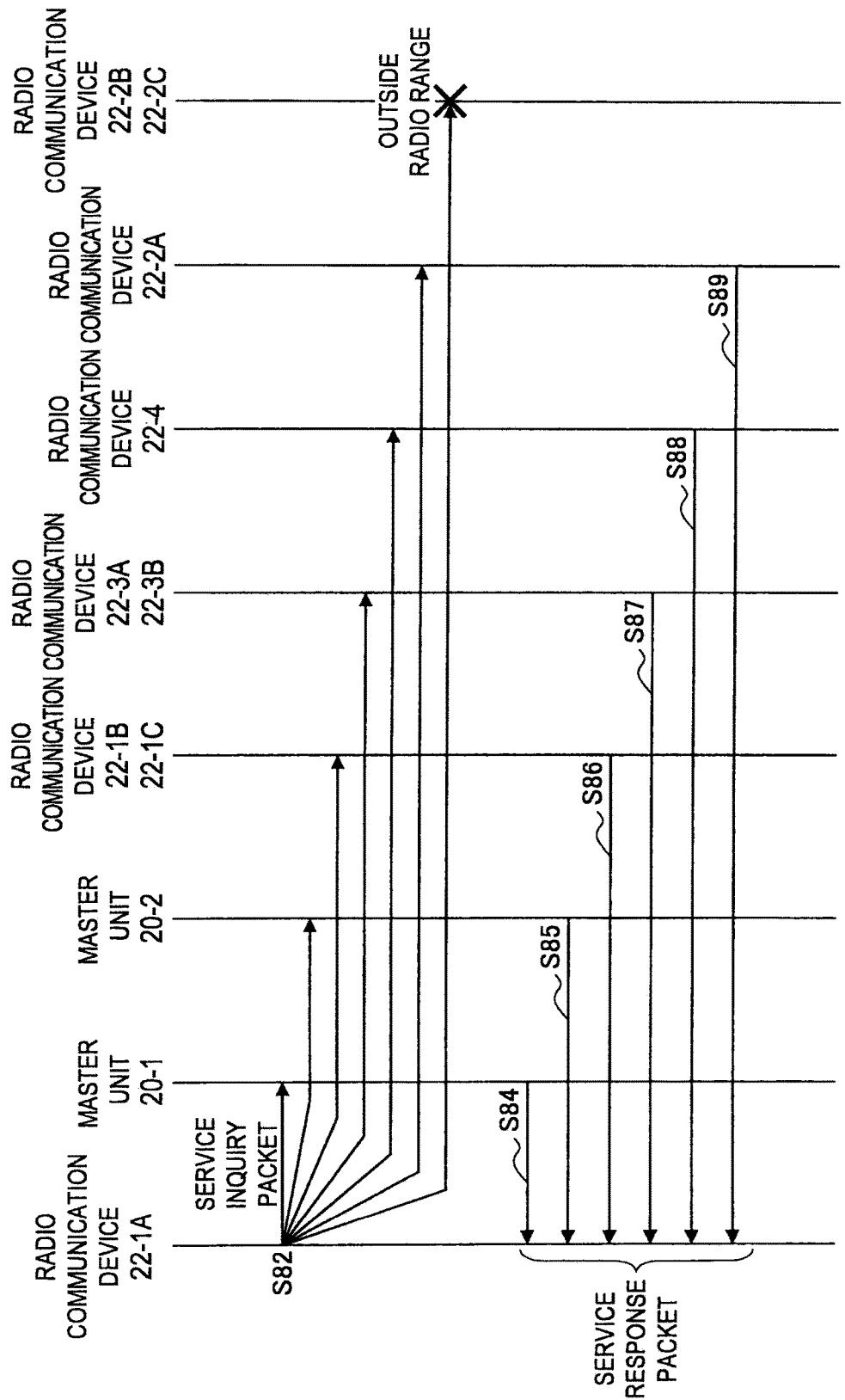
FIG. 8 is a sequence chart showing a first operation example according to the embodiment.

FIG. 8 is a sequence chart showing the first operation example according to the embodiment. Referring to FIG. 8, the radio communication device 22-1A sends a service inquiry packet in order to make inquiry about services with which other radio communication devices existing in the vicinity are compatible (S82). The radio communication device 22-1A may send the service inquiry packet by broadcast, by multicast, or by designating a particular device at the other end of communication.

Figure 9:
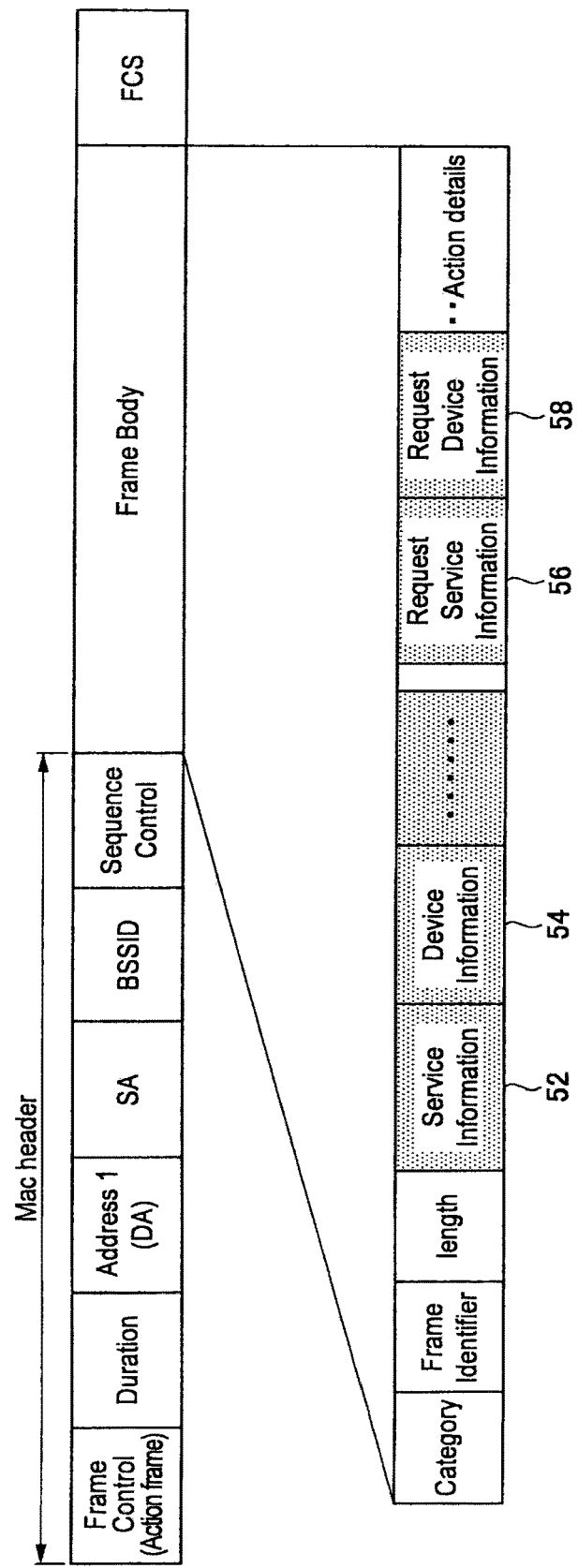
FIG. 9 is an explanatory view showing an exemplary structure of a service inquiry packet.

FIG. 9 is an explanatory view showing an exemplary structure of the service inquiry packet. The service inquiry packet conforms to an action frame specified by IEEE Std 802.11-2007, and includes Mac Header, Frame Body, and FCS as shown in FIG. 9. The Frame Body includes service information 52, device information 54, request service information 56, and request device information 58.

The service information 52 is information indicating a service with which a transmission source device is compatible. In the service information 52, information indicating a DMS (Digital Media Server), information indicating a DMP (Digital Media Player), information indicating an application or the like is described, for example.

The device information 54 is information indicating a device type of a transmission source device. In the device information 54, information indicating an audio device, information indicating a portable music playback device, information indicating a speaker or the like is described, for example.

The request service information 56 is information indicating a service of which execution is desired by a transmission source device. In the request service information 56, information indicating a DMS, information indicating a DMP, information indicating playback of video streaming, information indicating a TDLS, information indicating reading of video contents, information indicating playback of music, information indicating display of still pictures or the like is described, for example.

The request device information 58 is information indicating a device type which is requested for a device at the other end of communication by a transmission source device. In the request device information 58, as in the device information 54, information indicating an audio device, information indicating a portable music playback device, information indicating a speaker or the like is described. The service inquiry packet may further contain information indicating a compatible protocol, a service in execution, an authentication state, a channel in use, a corresponding channel, an association state, a joining group or the like.

The service inquiry packet described above is received by devices that exist within the radio range of the radio communication device 22-1A as shown in FIG. 8. Specifically, the master units 20-1 and 20-2 and the radio communication devices 22-1B, 22-1C, 22-3A, 22-3B, 22-4, and 22-2A that exist within the radio range receive the service inquiry packet. On the other hand, the radio communication devices 22-2B and 22-2C that exist outside the radio range do not receive the service inquiry packet.

After that, the master units 20-1 and 20-2 and the radio communication devices 22-1B, 22-1C, 22-3A, 22-3B, 22-4, and 22-2A that have received the service inquiry packet send service response packets to the radio communication device 22-1A (S84 to S89).

Figure 10:
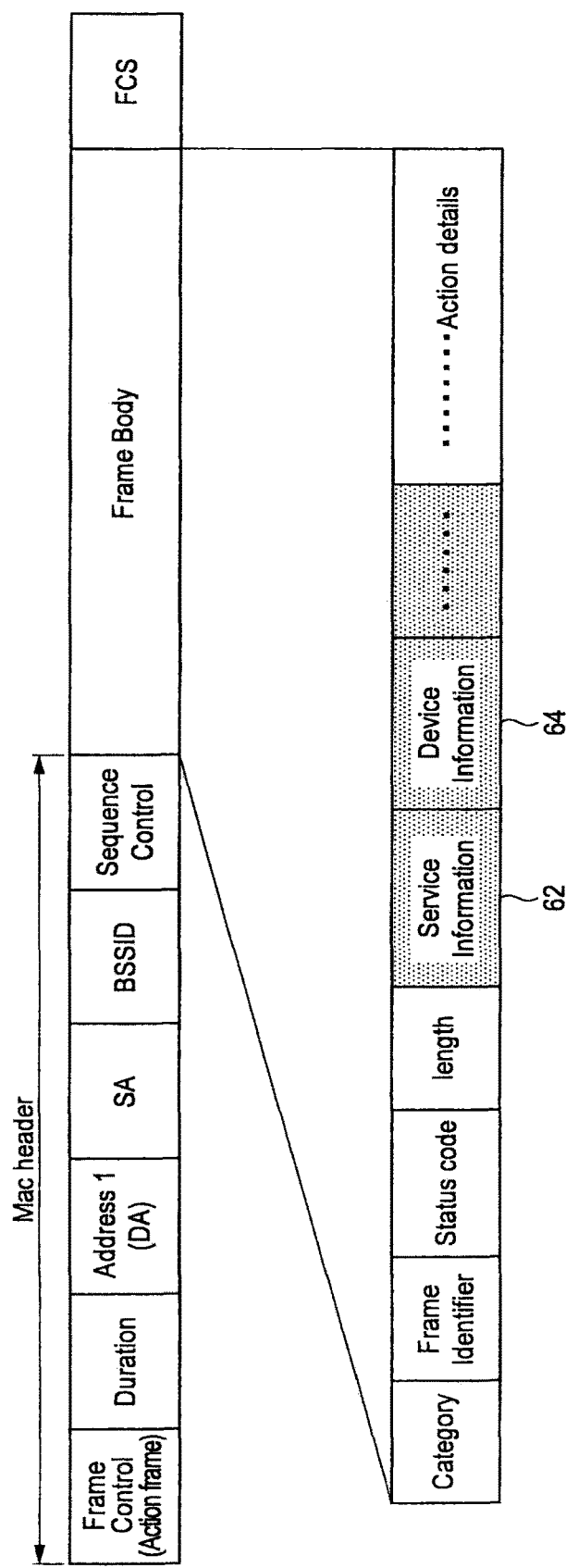
FIG. 10 is an explanatory view showing an exemplary structure of a service response packet.

FIG. 10 is an explanatory view showing an exemplary structure of the service response packet. The service response packet conforms to an action frame specified by IEEE Std 802.11-2007. Therefore, the radio communication devices 22-1B, 22-1C, 22-3A, 22-3B, 22-4, and 22-2A that have received the service inquiry packet can send the service response packets regardless of a connection state or an authentication state with the master unit 20.

Further, the service response packet includes Mac Header, Frame Body, and FCS as shown in FIG. 10. The Frame Body includes service information 62 and device information 64 related to a transmission source device. Thus, the radio communication device 22-1A can find the radio communication devices 22 that exist within the radio range and further recognize the services with which the radio communication devices 22 that exist within the radio range are compatible. Note that the service response packet may further contain information indicating a compatible protocol, a service in execution, an authentication state, a channel in use, a corresponding channel, an association state, an authentication state, a joining group or the like.

Further, the radio communication device 22-1A may use the service information or the like obtained from the service response packet for selection of a device at the other end of communication or selection of a communication mode. For example, the radio communication device 22-1A may select the radio communication device 22 which is compatible with a desired service, select the most appropriate communication mode with the selected radio communication device 22, and performs processing for implementing the selected communication mode. The communication mode may include direct communication between the radio communication devices 22, indirect communication through the master unit 20 or the like.

For example, it is assumed that the radio communication device 22-1A selects the radio communication device 22-4 as a device at the other end of communication for image transfer and selects the communication mode that decides a parentage at the time of forming a connection group under Wi-Fi Alliance standards development for ensuring the necessary throughput. In this case, the radio communication device 22-1A disconnects the connection with the master unit 20-1 according to need and sends a connection request to the radio communication device 22-4 or the master unit 20 of the radio communication device 22-4, thereby forming a new network.

As another example, it is assumed that the radio communication device 22-1A selects the radio communication device 22-4 as a device at the other end of communication for streaming transmission and selects the TDLS as the communication mode (connection mode, physical topology) for ensuring the necessary throughput. In this case, the radio communication device 22-1A exchanges a notification indicating the start of TDLS connection processing with the radio communication device 22-4 and performs the connection processing in accordance with the procedure specified by IEEE P802.11/D5.0, thereby establishing communication with the radio communication device 22-4.

3-2. Second Operation Example

FIG. 11 is a sequence chart showing the second operation example according to the embodiment. Referring to FIG. 11, the radio communication device 22-1A sends a service inquiry packet in order to make inquiry about services with which other radio communication devices existing in the vicinity are compatible (S92). The radio communication device 22-1A may send the service inquiry packet by broadcast, by multicast, or by designating a particular device at the other end of communication.

The service inquiry packet is then received by devices that exist within the radio range of the radio communication device 22-1A as shown in FIG. 11. Specifically, the master units 20-1 and 20-2 and the radio communication devices 22-1B, 22-1C, 22-3A, 22-3B, 22-4, and 22-2A that exist within the radio range receive the service inquiry packet. On the other hand, the radio communication devices 22-2B and 22-2C that exist outside the radio range fail to receive the service inquiry packet.

In the second operation example, each device that has received the service inquiry packet determines whether it is compatible with the service indicated by the request service information 56 included in the service inquiry packet and, only when it is compatible, sends a service response packet.

Therefore, as shown in FIG. 11, when only the radio communication device 22-4 is compatible with the service indicated by the request service information 56, for example, the radio communication device 22-4 sends the service response packet to the radio communication device 22-1A (S94). Therefore, the radio communication device 22-1A can find the radio communication device 22 that exists within the radio range and is compatible with the desired service.

Further, the radio communication device 22-1A may analyze the service response packet and select the most appropriate communication mode for the service which it intends to execute.

For example, it is assumed that the radio communication device 22-1A selects the radio communication device 22-4 as a device at the other end of communication for image transfer and selects the communication mode that decides a parentage at the time of forming a connection group under Wi-Fi Alliance standards development for ensuring the necessary throughput. In this case, the radio communication device 22-1A disconnects the connection with the master unit 20-1 according to need and sends a connection request to the radio communication device 22-4 or the master unit 20 of the radio communication device 22-4, thereby forming a new network.

As another example, it is assumed that the radio communication device 22-1A selects the radio communication device 22-4 as a device at the other end of communication for streaming transmission and selects the TDLS as the communication mode for ensuring the necessary throughput. In this case, the radio communication device 22-1A exchanges a notification indicating the start of TDLS connection processing with the radio communication device 22-4 and performs the connection processing in accordance with the procedure specified by IEEE P802.11z/D5.0, thereby establishing connection with the radio communication device 22-4.

4. Summary

As described above, the radio communication device 22 according to the embodiment sends and receives the service inquiry packet and the service response packet which can be sent and received regardless of a connection state or an authentication state. The radio communication device 22 can thereby effectively collect information of other radio communication devices existing within its radio range. Further, the radio communication device 22 can make selection of a device at the other end of communication and selection of a communication mode by using the collected information.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the radio communication system of the specification in chronological order according to the sequence shown in sequence charts. For example, the steps in the processing of the radio communication system may be processed in a different sequence from the sequence shown in sequence charts or may be processed in parallel.

Furthermore, it is possible to create a computer program that causes hardware such as a CPU, ROM and RAM incorporated in the radio communication device 22 to perform the equal functions to the elements of the radio communication device 22 described above. Further, a storage medium that stores such a computer program may be provided.

The present application contains subject matter related to that disclosed in Japanese Priority Patent Application JP 2009-271363 filed in the Japan Patent Office on Nov. 30, 2009, the entire content of which is hereby incorporated by reference.

What is claimed is:

1. A radio communication device comprising:
   a communication unit that communicates with another radio communication device; and
   a control unit that, when a prescribed service inquiry packet sent from the another radio communication device is received by the communication unit, controls the communication unit to send a service response packet based on an action frame as specified by IEEE 802.11 and containing response service information indicating a compatible protocol with which the radio communication device is compatible,
   wherein the service inquiry packet is based on the action frame as specified by IEEE 802.11 and comprises inquiry service information indicating a compatible protocol with which the another radio communication device is compatible,
   wherein the action frame comprises a Media Access Control (MAC) Header, Frame Body, and Frame Check Sequence (FCS), and the service response packet is sent in a case that the compatible protocol with which the radio communication device is compatible is different from the compatible protocol with which the another radio communication device is compatible, and
   wherein the communication unit and the control unit are each implemented via at least one processor.

2. The radio communication device according to claim 1, wherein the control unit performs control of sending the service response packet regardless of an authentication state of the radio communication device.

3. The radio communication device according to claim 2, wherein the inquiry service information contained in the service inquiry packet and the response service information contained in the service response packet are interpreted in a data link layer without depending on the compatible protocol of each device.

4. The radio communication device according to claim 3, wherein the service inquiry packet and the service response packet conform to the action frame as specified by IEEE Std 802.11-2007.

5. The radio communication device according to claim 4, wherein the service response packet is used for selection of a device at another end of communication by said another radio communication device.

6. The radio communication device according to claim 1, wherein the control unit sends the service response packet regardless of whether or not the radio communication device is a compatible source of digital media.

7. The radio communication device according to claim 6, wherein the control unit performs control of sending the service response packet regardless of an authentication state of the radio communication device.

8. The radio communication device according to claim 1, wherein the radio communication device establishes a connection with the another radio communication device and transmits digital media to the another radio communication device via the communication unit, wherein the digital media comprises a streaming data.

9. The radio communication device according to claim 8, wherein the streaming data comprises a video.

10. The radio communication device according to claim 8, wherein the streaming data comprises an audio signal.

11. The radio communication device according to claim 1, wherein the service inquiry packet further comprises device information indicating a device type of the another radio communication device.

12. The radio communication device according to claim 1, wherein the compatible protocol is a protocol used to connect the radio communication device and the another radio communication device in order to exchange data between the radio communication device and the another radio communication device in a connection state.

13. A first wireless communication station using data defined in IEEE 802.11, comprising circuitry configured to:
receive a service request signal from a second wireless communication station using an action frame as specified by IEEE 802.11, the service request signal requesting a service response signal, wherein the service request signal includes information indicating a compatible protocol with which the second wireless communication station is compatible and specifying a communication type, wherein the communication type includes at least TDLS;
generate a packet signal using the action frame as specified by IEEE 802.11 including information indicating a compatible protocol with which the first wireless communication station is compatible and specifying whether the first wireless communication station can connect to the second wireless communication station; and
transmit the packet signal as the service response signal to the service request signal,
wherein the action frame comprises a Media Access Control (MAC) Header, Frame Body, and Frame Check Sequence (FCS), and the packet signal is transmitted in a case that the compatible protocol with which the second wireless communication station is compatible is different from the compatible protocol with which the first radio communication station is compatible.

14. The first wireless communication station according to claim 13, wherein the information indicating the compatible protocol is detected in a data link layer.

15. The first wireless communication station according to claim 13, further comprising a protocol stack of UPnP or Bonjour.

16. The first wireless communication station according to claim 13, further comprising an antenna.

17. A second wireless communication station using data defined in IEEE 802.11, comprising circuitry configured to:
transmit a service request signal using an action frame as specified by IEEE 802.11, the service request signal requesting a service response signal, wherein the service request signal includes information indicating a compatible protocol with which the second wireless communication station is compatible and specifying a communication type, wherein the communication type includes at least TDLS; and
receive a packet signal as the service response signal using the action frame as specified by IEEE 802.11 including information indicating a compatible protocol with which the first wireless communication station is compatible and specifying whether a first wireless communication station can connect to the second wireless communication station,
wherein the action frame comprises a Media Access Control (MAC) Header, Frame Body, and Frame Check Sequence (FCS), and the packet signal is received in a case that the compatible protocol with which the second wireless communication station is compatible is different from the compatible protocol with which the first wireless communication station is compatible.

18. The second wireless communication station according to claim 17, wherein the information indicating the compatible protocol is detected in a data link layer.

19. The second wireless communication station according to claim 17, further comprising a protocol stack of UPnP or Bonjour.

20. The second wireless communication station according to claim 17, further comprising an antenna.

21. A method of processing data defined in IEEE 802.11, comprising a first wireless communication station:
receiving a service request signal from a second wireless communication station using an action frame as specified by IEEE 802.11, the service request signal requesting a service response signal, wherein the service request signal includes information indicating a compatible protocol with which the second wireless communication station is compatible and specifying a communication type, wherein the communication type includes at least TDLS;
generating a packet signal as the service response signal using the action frame as specified by IEEE 802.11 including information indicating a compatible protocol with which the first wireless communication station is compatible and specifying whether the first wireless communication station can connect to the second wireless communication station; and
transmitting the packet signal using an action frame as specified by IEEE 802.11 as the service response signal to the request signal,
wherein the action frame comprises a Media Access Control (MAC) Header, Frame Body, and Frame Check Sequence (FCS), and the packet signal is transmitted in a case that the compatible protocol with which the second wireless communication station is compatible is different from the compatible protocol with which the first wireless communication station is compatible.

22. The method according to claim 21, wherein the information indicating the compatible protocol is detected in a data link layer.

23. The method according to claim 21, where the first communication station comprising a protocol stack of UPnP or Bonjour.

24. The method according to claim 21, wherein the first communication station comprises an antenna.

25. A method of processing data defined in IEEE 802.11, comprising a second wireless communication station:
transmitting a service request signal using an action frame as specified by IEEE 802.11, the service request signal requesting a service response signal, wherein the service request signal includes information indicating a compatible protocol with which the second wireless communication station is compatible and specifying a communication type, wherein the communication type includes at least TDLS; and receiving a packet signal as the service response signal using the action frame as specified by IEEE 802.11 including information indicating a compatible protocol with which the first wireless communication station is compatible and specifying whether a first wireless communication station can connect to the second wireless communication station, wherein the action frame comprises a Media Access Control (MAC) Header, Frame Body, and Frame Check Sequence (FCS), and the packet signal is received in a case that the compatible protocol with which the second wireless communication station is compatible is different from the compatible protocol with which the first wireless communication station is compatible.

26. The method according to claim 25, wherein the information indicating the compatible protocol is detected in a data link layer.

27. The method according to claim 25, wherein the second wireless communication station comprises a protocol stack of UPnP or Bonjour.

28. Method according to claim 25, wherein the second wireless station comprises an antenna.

29. A radio communication system comprising:
a first radio communication device that sends a prescribed service inquiry packet,
wherein the service inquiry packet is based on an action frame as specified by IEEE 802.11 and comprises inquiry service information indicating a compatible protocol with which the first radio communication device is compatible; and
a second radio communication device that communicates with a connected radio communication device operating as a master unit, wherein the second radio communication device comprises:
a communication unit that communicates with the connected radio communication device, and
a control unit that, when the prescribed service inquiry packet sent from the first radio communication device is received by the communication unit, controls the communication unit to send a service response packet based on the action frame as specified by IEEE 802.11 and containing response service information indicating a compatible protocol with which the second radio communication device is compatible, wherein the compatible protocol is a protocol used to connect to the first radio communication device in order to exchange data in a connection state,
wherein the action frame comprises a Media Access Control (MAC) Header, Frame Body, and Frame Check Sequence (FCS), and the service response packet is sent in a case that the compatible protocol with which the first radio communication device is compatible is different from the compatible protocol with which the second radio communication device is compatible, and
wherein the communication unit and the control unit are each implemented via at least one processor of the second radio communication device.

30. A non-transitory computer-readable medium having embodied thereon a program that, when executed by a processor of a radio communication device, causes the radio communication device to execute a method, the method comprising:

communicating with another radio communication device as a master unit; and sending, when a prescribed service inquiry packet sent from the another radio communication device is received, a service response packet to the another radio communication device, wherein the service response packet is based on an action frame as specified by IEEE 802.11 and contains response service information indicating a compatible protocol with which the radio communication device is compatible, wherein the service inquiry packet is based on the action frame as specified by IEEE 802.11 and comprises inquiry service information indicating a compatible protocol with which the another radio communication device is compatible, wherein the action frame comprises a Media Access Control (MAC) Header, Frame Body, and Frame Check Sequence (FCS), and the service response packet is sent in a case that the compatible protocol with which the radio communication device is compatible is different from the compatible protocol with which the another radio communication device is compatible.

31. A radio communication method comprising:
sending a prescribed service inquiry packet from a first radio communication device, wherein the service inquiry packet is based on an action frame as specified by IEEE 802.11 and comprises inquiry service information indicating a compatible protocol with which the first radio communication device is compatible;
receiving the service inquiry packet by a second radio communication device that communicates with a connected radio communication device operating as a master unit; and
sending a service response packet based on the action frame as specified by IEEE 802.11 and containing response service information indicating a compatible protocol with which the second radio communication device is compatible and also indicating whether or not the second radio communication can provide digital media to the first radio communication device,
wherein the action frame comprises a Media Access Control (MAC) Header, Frame Body, and Frame Check Sequence (FCS), and the service response packet is sent in a case that the compatible protocol with which the first radio communication device is compatible is different from the compatible protocol with which the second radio communication device is compatible.

32. A first wireless communication station using data defined in IEEE 802.11, comprising:
at least one processor configured to:
receive a service request signal from a second wireless communication station using an action frame as specified by IEEE 802.11, the service request signal requesting a service response signal, wherein the service request signal includes information indicating a compatible protocol with which the second wireless communication station is compatible and specifying a communication type, wherein the communication type includes at least TDLS;
generate a packet signal as the service response signal using the action frame as specified by IEEE 802.11 including information indicating a compatible protocol with which the first wireless communication station is compatible and specifying whether the first wireless communication station can connect to the second wireless communication station; and transmit the packet signal as the service response signal to the request signal, wherein the action frame comprises a Media Access Control (MAC) Header, Frame Body, and Frame Check Sequence (FCS), and the packet signal is transmitted in a case that the compatible protocol with which the second wireless communication station is compatible is different from the compatible protocol with which the first wireless communication station is compatible.

33. A second wireless communication station using data defined in IEEE 802.11, comprising:

at least one processor configured to:
- transmit a service request signal using an action frame as specified by IEEE 802.11, the service request signal requesting a service response signal, wherein the service request signal includes information indicating a compatible protocol with which the second wireless communication station is compatible and specifying a communication type, wherein the communication type includes at least TDLS; and
- receive a packet signal as the service response signal using the action frame as specified by IEEE 802.11 including information indicating a compatible protocol with which the first wireless communication station is compatible and specifying whether a first wireless communication station can connect to the second wireless communication station, wherein the action frame comprises a Media Access Control (MAC) Header, Frame Body, and Frame Check Sequence (FCS), and the packet signal is received in a case that the compatible protocol with which the second wireless communication station is compatible is different from the compatible protocol with which the first wireless communication station is compatible.

* * * * *